Dec. 24, 1929.  T. E. McFALL  1,740,775
MOLDING MACHINE
Filed April 23, 1928  4 Sheets-Sheet 2

Inventor
Thurlow E. McFall
By Liverance & Van Antwerp
Attorneys

Dec. 24, 1929.  T. E. McFALL  1,740,775
MOLDING MACHINE
Filed April 23, 1928  4 Sheets-Sheet 3

Inventor
Thurlow E. McFall
By Liverance & Van Antwerp
Attorneys

Dec. 24, 1929.  T. E. McFALL  1,740,775
MOLDING MACHINE
Filed April 23, 1928   4 Sheets-Sheet 4

Inventor
Thurlow E. McFall
By Liverance and
Van Antwerp
Attorneys

Patented Dec. 24, 1929

1,740,775

UNITED STATES PATENT OFFICE

THURLOW E. McFALL, OF SPARTA, MICHIGAN, ASSIGNOR TO SPARTA FOUNDRY COMPANY, OF SPARTA, MICHIGAN, A CORPORATION OF MICHIGAN

MOLDING MACHINE

Application filed April 23, 1928. Serial No. 272,009.

This invention relates to a molding machine specifically intended for use in making molds for piston ring castings though not limited in any sense to the one use stated. It is an object and purpose of the present invention to provide a molding machine which is simply and easily operated and with which molds can be produced very rapidly with a consequent economy in cost of production of castings. The invention consists of many novel details of construction and arrangements of parts for providing a machine capable of obtaining the ends stated as well as many others, not at this time specifically enumerated but which will appear when an understanding of the invention is had from the following description taken in connection with the accompanying drawings, in which, Fig. 1 is a partial vertical section and front elevation of the molding machine of my invention.

Like reference characters refer to like parts in the different figures of the drawings.

Figure 1:
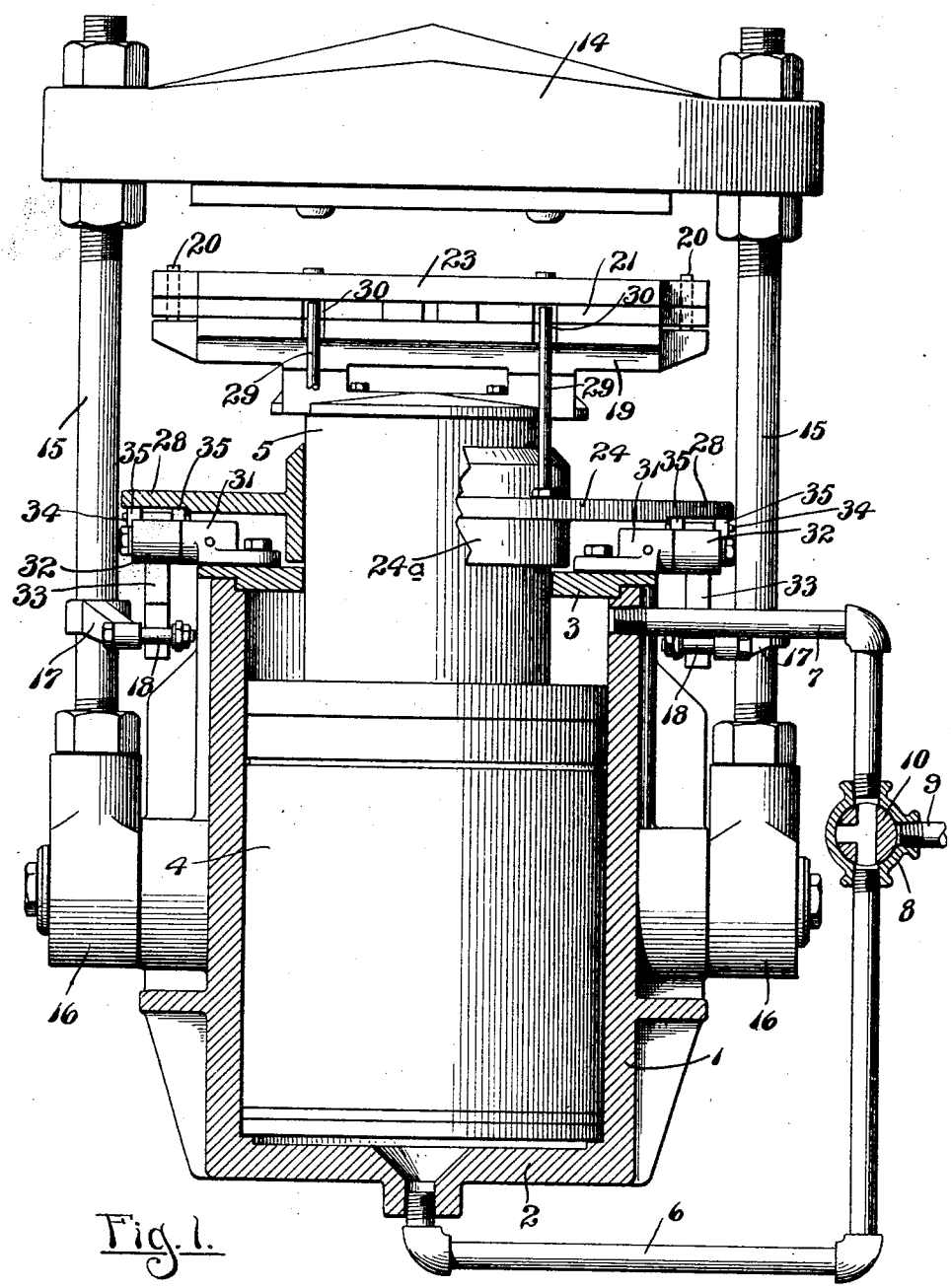

In the construction of the molding machine a vertical cylinder 1 having an integral bottom 2 is provided, the open upper end of which is closed by a plate or head 3. A piston 4 is mounted for reciprocation in the cylinder the length of which is less than the length of the cylinder. At its upper end it is provided with a vertical ram 5 of less diameter than the piston which passes through an opening in the plate 3 and above the same.

A compressed air carrying pipe 6 leads into the bottom 2 of the cylinder while a second compressed air carrying pipe 7 leads into the cylinder adjacent the upper end thereof. Said pipes 6 and 7 connect with a valve casing 8 at diametrically opposed sides thereof, while a third pipe 9 connects with the casing, the latter pipe leading to any suitable source of compressed air. A valve 10 is mounted for rotation in the casing 8 which, as shown in Fig. 1, has a passage therethrough from which a branch extends at right angles to the outer side of the valve. When the valve is in the position shown in Fig. 1 there is a direct connection of the pipes 6 and 7, while the supply of compressed air through the pipe 9 is cut off.

This is the position of the valve when the piston 4 is to be returned to its lowermost position after having been elevated. The compressed air below the cylinder passes through the pipe 6 and through the valve 10 into the pipe 7 and above the piston 4. The space above the piston 4 to receive compressed air is considerably less in volume than the space below the piston 4 which has been filled with compressed air during the preceding elevation of the piston. Accordingly, the first movement of the piston 4 in a downward direction is rapid but very shortly the space above the piston is filled with compressed air and can receive no more from below the piston except as it leaks out of the cylinder through the opening in the plate 3 around the ram 5. This leakage is such that the latter part of the movement of the piston 4 is slow and the piston returns to its lowermost position without jar. When the valve is turned a quarter turn in a counter clockwise direction, referring to Fig. 1, air through the pipe 9 is passed into the cylinder underneath the piston and lifts the same rapidly.

Figure 7:
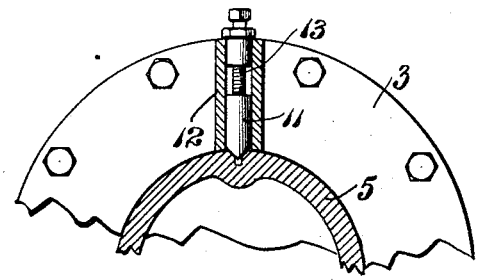

The ram 5 and attached piston 4 are held against rotation, the ram having a groove at one side in which a gib or key 11 (see Fig. 7) normally seats, it being mounted in a sleeve 12 cast with the upper head 3 for the cylinder and adjusted into operative position with respect to the groove by means of an adjusting screw 13.

A molding head 14 is located a distance above the ram, being mounted at its ends on two heavy rods 15 which at their opposite ends connect with journals 16. The rods 15 with the attached journals lie at opposite sides of the cylinder 1 and the journals are mounted on trunnions projected from the cylinder whereby the head may be moved back and forth about a horizontal axis from a position directly over the ram 5 to other positions rearward thereof. Each rod 15 adjacent its lower end is equipped with a forwardly extending arm 17 from the free forward end of which a pin 18 extends inwardly. The purpose of the arms and pins 18 will be later described.

Figure 5:
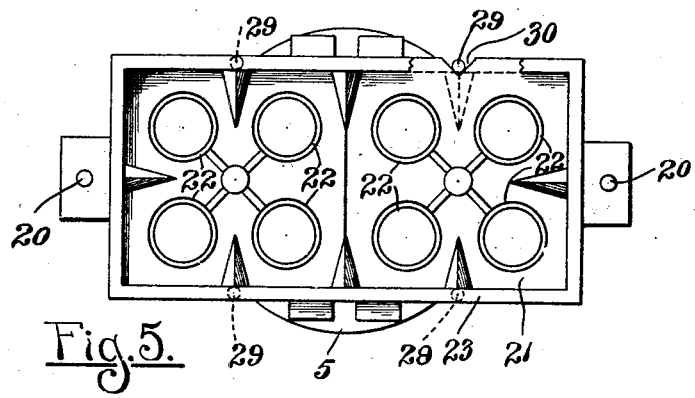
Fig. 5 is a plan view illustrating the pattern plate and flask which is located thereover.

A molding table 18 is secured to the upper end of the ram 5 from which, at opposite ends, vertical flask pins 20 extend. On the table a pattern plate 21 is located having a plurality of ring patterns 22 connected by suitable gate and riser patterns, as shown in Fig. 5, while over the pattern plate the flask 23 is placed, both the pattern plate and the flask having end projections with openings to pass over the pins 20 to thereby properly locate the pattern plate and flask with respect to each other and to the table 19. The flask is a shallow rectangular frame, as shown.

Figure 6:
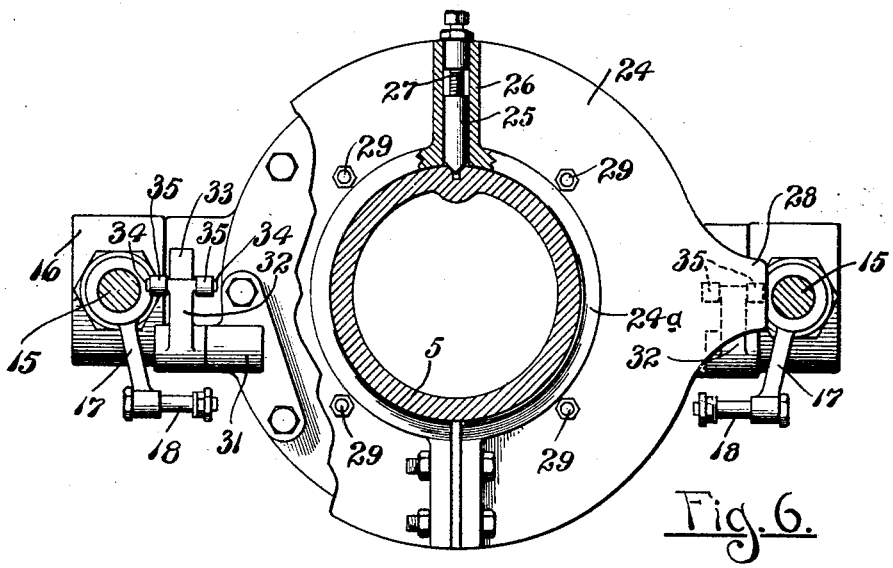
Fig. 6 is a horizontal section and plan with the parts broken away, the plane of the section being through the upper end of the pneumatic ram substantially on line 6—6 of Fig. 2, and, Fig. 7 is a fragmentary horizontal section, the plane thereof being located substantially on the line 7—7 of Fig. 2.

A circular horizontal plate 24, formed at its center with a vertical sleeve 24ª located around the ram 5, is positioned over the upper end of the cylinder 1. It is freely movable in a vertical direction with respect to the ram 5 but is held from rotative movement relative thereto by a gib or key 25 mounted in a sleeve 26 on the plate 24, the inner end of the gib being received in the groove previously mentioned as formed in the ram 5 and held in said groove by an adjusting screw 27, as shown in Fig. 6.

The plate 24 at diametrically opposed sides has lateral projections 28. It also carries a plurality of vertical rods 29 which are secured at their lower ends to the plate and which extend upwardly alongside of the table 19 and the pattern plate 21, both the table and pattern plate having triangular notches 30 in the sides thereof for passing the upper end portions of the rods 29; while the flask 23 rests upon the upper end of said rods.

Figure 2:
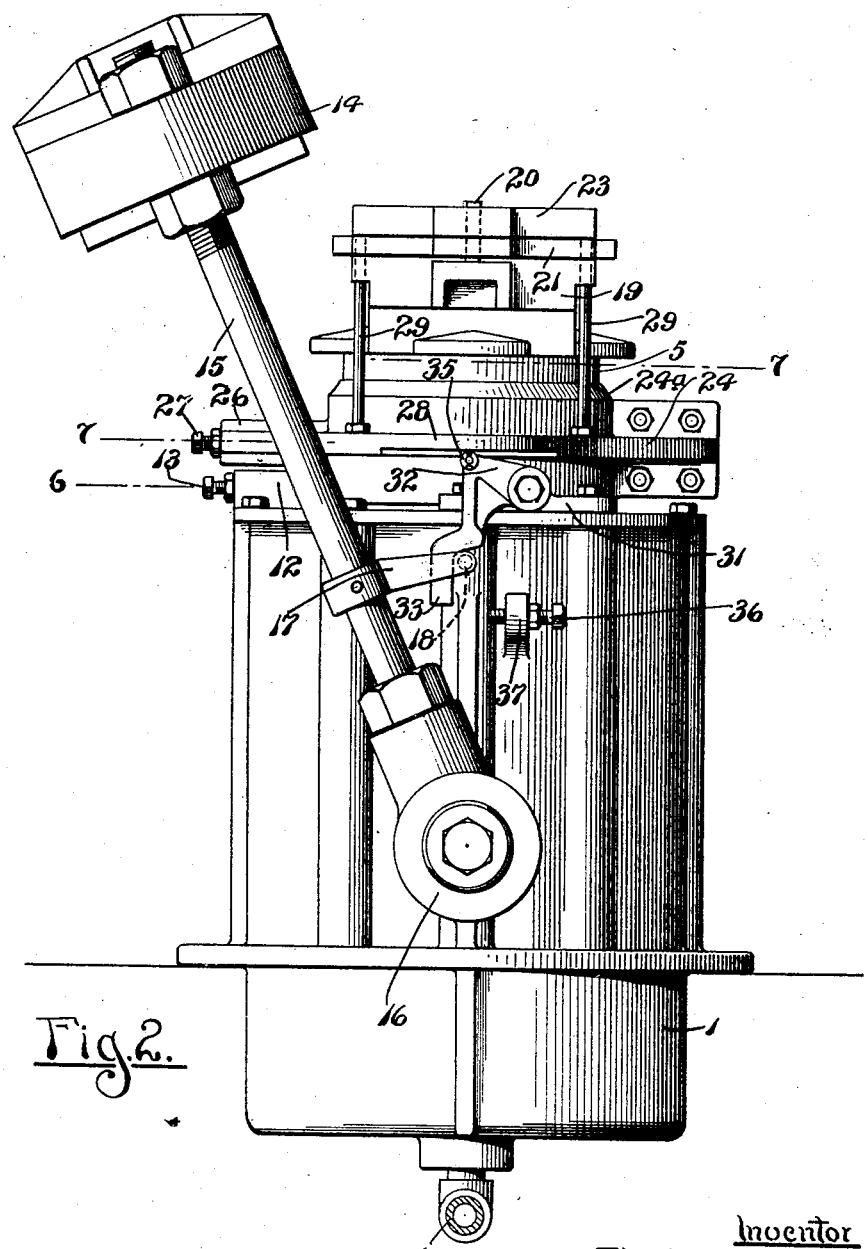
Fig. 2 is a side elevation of the machine showing the same with the upper head thereof turned partly toward its rear position.

Suitable brackets 31, one at each side of the head 3 of the cylinder and located substantially under the projections 28 of the plate 24 are provided, on each of which a lever is pivotally mounted. The lever includes one arm 32, which, as shown in Fig. 2, is approximately horizontal, and a second arm 33 of somewhat irregular shape and which extends downwardly from the free end of the arm 32. At the angle made between the arms 32 and 33 are laterally extending horizontal trunnions on each of which a roller 35 is mounted, there being a pair of rollers directly under each lateral projection 28 of the plate 24. There is one of said levers at each side of the machine cooperating with the pins 18 carried by the arms 17, one of said pins and arms at each side of the machine being located in front of a depending arm 33 of a lever. It is evident that when the head 14 is swung back and forth about the horizontal axis of the trunnions on which the journals 16 are mounted, the pins 18 bearing against the front sides of the depending end portions of the arms 33, serve to turn said levers about their pivots and elevate the rollers 35 with a consequent elevation of the table 24 and the attached rods 29.

In the position of the machine when a mold is to be made the pattern plate 20 rests upon the table 19 and the flask 23 upon the pattern plate, while the head 14 is located in an intermediate position a short distance back of the pattern plate, as shown in Fig. 2. In such position the plate 24 with the rods 29 thereon is lowered permitting the flask to bear against the pattern plate. The flask is filled with sand after which the head 14 is grasped and pulled forward until it lies directly over the flask. The forward movement of the head is stopped by rods 15 coming into engagement with stop screws 36 threaded through lugs 37 one at each side of the cylinder 1, as shown in Fig. 2. The air valve 10 is then turned to open a passage for compressed air through the inlet pipe 6 to the lower end of the cylinder. The compressed air lifts the piston 4 and the attached ram 5 carrying the table 19, the pattern plate and the flask upwardly and forcing the mold against the head 14 with a resultant compressing or tamping of the sand to proper density. The valve 10 is turned back a quarter turn whereupon the compressed air below the piston flows to the upper part of the cylinder through the pipe 7 and above the piston, the piston dropping rapidly at the beginning but later checking its return movement so no jar occurs, as has been previously described.

Figure 3:
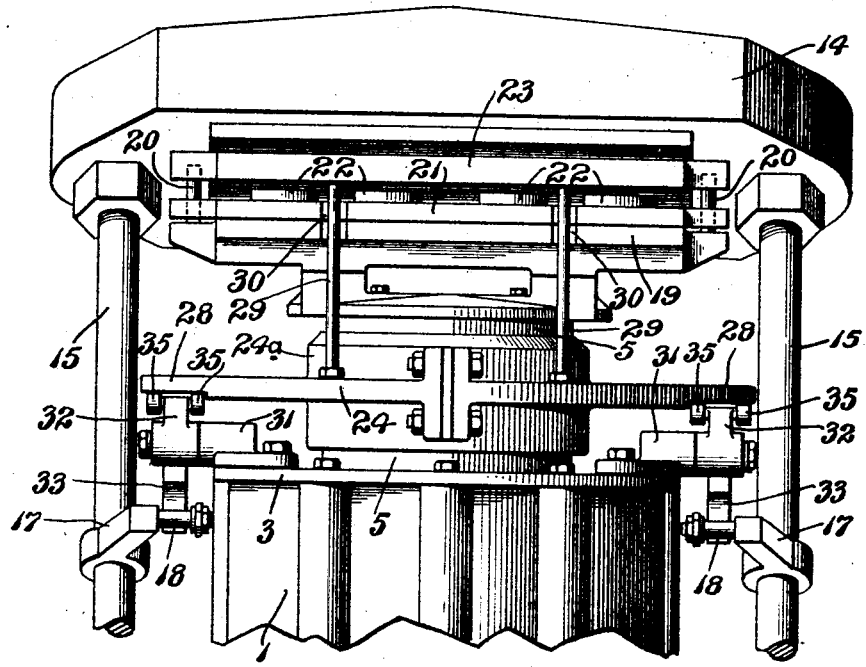
Fig. 3 is a fragmentary front elevation of the machine illustrating the manner in which the mold is drawn and lifted from the pattern plate.
Figure 4:
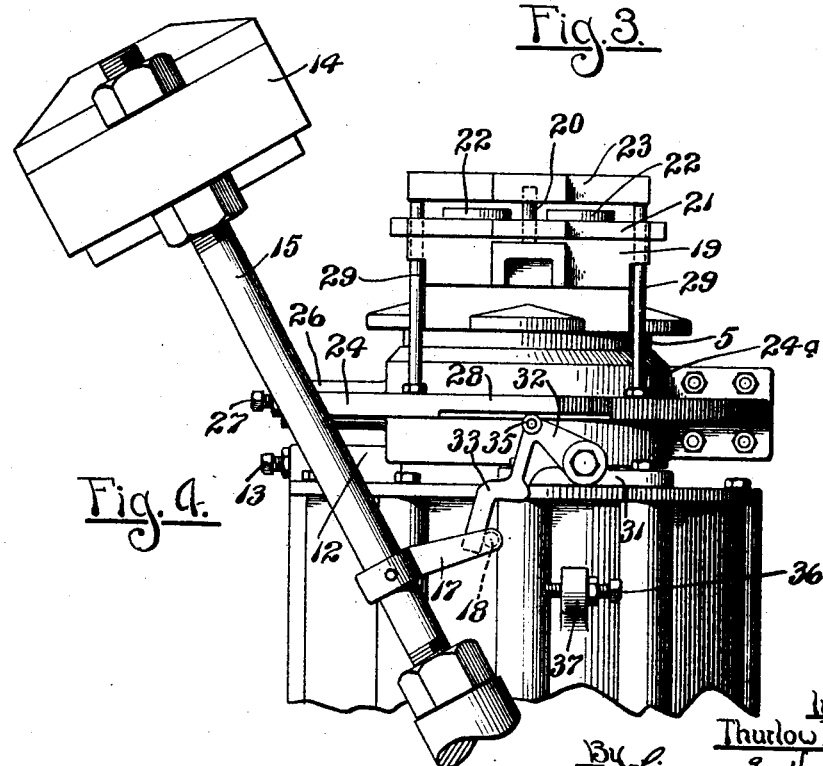
Fig. 4 is a fragmentary side elevation of the structure shown in Fig. 3 and with the parts in the same position.

The mold within the flask 23 is then in a lower position lying upon the pattern plate. In order to remove the mold and draw it from the pattern plate the head 14 must be pushed to the rear. During the first part of its movement or until it clears the mold and flask no action occurs as the pins 18 do not come to the arms 33 until the head has reached approximately the position shown in Fig. 2. A continued rearward movement of the head 14 turns the levers and elevates the rollers 35 with a consequent lifting of the plate 24. The rods 29 are lifted at the same time and being directly under the sides of the flask 23, elevate said flask above the pattern plate. This action is fully shown in Figs. 3 and 4. The flask may then be removed, being lifted enough to disengage from the pins 20 and it with the mold therein taken from the machine. A new flask is put in the place of the old for a repetition of the molding operation.

The machine described is in practical service and has proved exceptionally practical, efficient, durable and serviceable. It is relatively simple in construction, may be easily operated by an operator and with it molds may be produced very rapidly.

The invention is defined in the appended claims and is to be considered comprehensive of all forms of structure coming within their scope.

I claim:

1. A molding machine comprising, a vertical cylinder, a piston mounted for reciprocation therein, a head at the upper end of the cylinder, a ram on the piston passing through said head, a valve casing, a pipe leading from one side thereof to the lower end of the cylinder, a second pipe leading from the opposite side of the valve casing to the upper end of the cylinder, a third pipe adapted to carry compressed air leading into the valve casing between the two first mentioned pipes, and a rotary valve mounted in the valve casing and having passages adapted in one position to connect the compressed air carrying pipe with the first mentioned pipe to carry compressed air into the lower end of the cylinder and in another position to connect the first and second mentioned pipes to carry air from the lower part of the cylinder to the upper part thereof around said ram, the opening through the upper head of the cylinder for the passage of the ram permitting a leakage of air therethrough around the ram.

2. In a molding machine, a cylinder having an open end, a piston mounted in said cylinder, a head closing the open end of the cylinder, a ram of less diameter than the piston connected to said piston and passing through an opening in said head, means for carrying compressed air to the cylinder at one end thereto to force the piston lengthwise of the cylinder and project the ram outwardly, and means for cutting off the passage of compressed air to said cylinder at said end thereof and for carrying it from said end of the cylinder to the opposite end and around said ram, for the purposes described.

3. A molding machine comprising, a vertically positioned cylinder having an open upper end, a plate closing the upper end of the cylinder, a piston within said cylinder, a ram connected to and extending from the upper end of the piston through said plate, a molding table secured to the upper end of the ram on which a pattern plate is adapted to be placed with a flask located over the pattern plate, a pair of rods, one at each side of the machine pivotally mounted thereon at their lower ends to turn about a horizontal axis, a molding head carried by and between the upper end portions of said rods and movable into a position directly over the molding table, means for forcing said piston upwardly to bring the flask carried on said molding table against the under side of the molding head to compress sand placed within said flask over the pattern plate, a second plate located around said ram below the molding table and mounted to slide vertically thereon, vertical rods attached to said plate and extending upwardly therefrom with their lower ends adapted to engage the under sides of said flask, elevating means mounted at the upper end of the cylinder to engage against the under side of said second plate to move the same upwardly, and operating means for said elevating means connected to the first rods whereby the elevating means is operated on pivotal movement of said first rods to a rear position, thereby elevating the flask and drawing the mold away from the pattern plate when the molding head is moved a predetermined distance to the rear.

4. A molding machine comprising, a vertical cylinder having an open upper end, a plate closing the upper end of the cylinder, a piston within said cylinder, a ram connected to the upper end of the piston and extending through said plate, a molding table carried by the upper end of said ram on which a pattern plate may be placed with a flask on and above said pattern plate, a pair of heavy rods, one at each side of the machine pivotally mounted at their lower ends on the cylinder to turn about a horizontal axis, a molding head carried by and located between the upper end portions of said rods, a collar located around said ram below the molding table and vertically movable thereon, a second plate extending from said collar, a plurality of vertical members attached to said plate and extending upwardly therefrom against the upper ends of which the flask is adapted to bear, a lever having two arms located at an angle to each other pivotally mounted at one end at each side of the cylinder, rollers at the angles of said levers adapted to bear against the under side of the second plate, an arm attached to each of said rods and a pin projecting laterally from the free end of each arm in front of the free end portion of each lever, for the purposes described.

5. In a molding machine, a vertically reciprocable ram, means for pneumatically moving the same in an upward direction, a molding table carried at the upper end of the ram, a molding head located horizontally above said table, means for mounting said molding head for movement into and out of operative positions with respect to the molding table, said table being adapted to carry a pattern plate and a molding flask above the plate, and means for lifting the flask above said pattern plate and drawing a mold therein from the patterns of said plate on movement of the molding head a predetermined distance away from its operative position over the molding table.

6. In a molding machine of the class described, a vertically reciprocable ram, a molding table carried at the upper end of the ram on which a pattern plate and a flask above the pattern plate are adapted to be carried, a molding head mounted for swinging movement from a front operative position to rear inoperative positions, means for pneumatically elevating the ram to compress sand placed in the flask between said pattern plate and the molding head, and means for automatically elevating the flask above the pattern plate on swinging movement of the molding head to a predetermined rear position.

7. A cylinder having a closed lower end and a cylinder head at its upper end, a piston in said cylinder, a ram attached to said piston and extending upward therefrom through said cylinder head, whereby the displacement within the cylinder by movement of the piston is greater below the piston than above the piston, means for supplying fluid to the cylinder below the piston, and means for exhausting the contents of the cylinder below the piston into the cylinder above the piston.

8. A cylinder having a closed lower end and a cylinder head at its upper end, a piston in said cylinder, a ram attached to said piston and extending upward therefrom through said cylinder head, whereby the displacement within the cylinder by movement of the piston is greater below the piston than above the piston, a valve, means for supplying fluid to said valve, a conduit leading from said valve to the cylinder below the piston, a conduit leading from said valve to the cylinder above the piston, and means incorporated in said valve for directing the fluid supply to the cylinder below the piston when the valve is in one position and for stopping the fluid supply and conducting the fluid from the cylinder below the piston to the cylinder above the piston when the valve is in another position.

9. In a molding machine, a vertically movable ram, a molding table on said ram adapted to carry a flask, a movable molding head located in operative position over said molding table and flask and means actuated by movement of said molding head out of operative position for elevating a flask on said molding table above said molding table.

10. In a molding machine, a vertically reciprocable ram, a molding table at the upper end of said ram adapted to carry a flask, a collar surrounding said ram and vertically movable thereon, a movable molding head located in operative position above said molding table, means actuated by movement of said molding head out of operative position for elevating said collar on said ram and means associated with said collar and engageable with a flask on said molding table to elevate the flask above the table when the collar is elevated on the ram.

In testimony whereof I affix my signature.

THURLOW E. McFALL.